(12) United States Patent
Dunsdon et al.

(10) Patent No.: US 11,631,334 B2
(45) Date of Patent: Apr. 18, 2023

(54) FLIGHT OPTIMIZATION SYSTEM AND METHOD FOR AIRLINE OPERATIONS

(71) Applicant: General Electric Company, Schenectady, NY (US)

(72) Inventors: Jonathan Dunsdon, Murphys, CA (US); Christopher Torta, North Sydney (AU); Gary Thelen, Grand Rapids, MI (US); Joel Klooster, Singapore (SG)

(73) Assignee: General Electric Company, Schenectady, NY (US)

( * ) Notice: Subject to any disclaimer, the term of this patent is extended or adjusted under 35 U.S.C. 154(b) by 325 days.

(21) Appl. No.: 16/911,374

(22) Filed: Jun. 24, 2020

(65) Prior Publication Data
US 2021/0005093 A1    Jan. 7, 2021

Related U.S. Application Data

(60) Provisional application No. 62/870,871, filed on Jul. 5, 2019.

(51) Int. Cl.
*G08G 5/00*        (2006.01)
*G06Q 50/28*       (2012.01)
(Continued)

(52) U.S. Cl.
CPC .............. *G08G 5/0039* (2013.01); *B64F 5/60* (2017.01); *G05B 17/02* (2013.01); *G05D 1/08* (2013.01);
(Continued)

(58) Field of Classification Search
CPC .... G08G 5/0039; G08G 5/0013; G08G 5/025; G08G 5/0021; G08G 5/0052;
(Continued)

(56) References Cited

U.S. PATENT DOCUMENTS

2013/0289804 A1*  10/2013  Covington ................ B64F 5/60
                                                               701/14

FOREIGN PATENT DOCUMENTS

CN         103373472 A       10/2013
CN         103538729 A        1/2014
(Continued)

OTHER PUBLICATIONS (Lindner, M., Rosenow, J., Förster, S. et al. Potential of integrated flight scheduling and rotation planning considering aerodynamic-, engine- and mass-related aircraft deterioration. CEAS Aeronaut J 10, 755-770 (2019)) (Year: 2018).*

(Continued)

*Primary Examiner* — James J Lee
*Assistant Examiner* — Shon G Foley
(74) *Attorney, Agent, or Firm* — Wood IP LLC

(57) ABSTRACT

Provided is a flight optimization system and a method of flight optimization that includes generating flight data via an onboard aircraft system, performing a pre-flight cycle by determining an updated tail assignment plan before departure based on the flight data received in real-time from the onboard aircraft system, performing an in-flight cycle by collating and processing in-flight data and external data via an onboard network server, and transmitting the processed data to an electronic flight bag in real-time and performing flight path optimization via a path optimizer application of the electronic flight bag to be accessed by flight personnel, and performing a post-flight cycle by transmitting post-flight data to an event measurement system along with operational data to be processed and sent to a fleet support system and a maintenance system for generating updated flight plans and maintenance plans which are data-driven.

11 Claims, 5 Drawing Sheets

(51) Int. Cl.

| | | |
|---|---|---|
| *G06Q 10/047* | (2023.01) | |
| *G06Q 50/06* | (2012.01) | |
| *G06Q 10/20* | (2023.01) | |
| *G06N 7/00* | (2023.01) | |
| *G05B 17/02* | (2006.01) | |
| *B64F 5/60* | (2017.01) | |
| *G05D 1/10* | (2006.01) | |
| *G05D 1/08* | (2006.01) | |
| *G08G 5/02* | (2006.01) | |
| *G06Q 50/30* | (2012.01) | |
| *G01W 1/00* | (2006.01) | |
| *B64D 45/00* | (2006.01) | |

(52) U.S. Cl.
CPC ............ *G05D 1/104* (2013.01); *G05D 1/106* (2019.05); *G06N 7/00* (2013.01); *G06Q 10/047* (2013.01); *G06Q 10/20* (2013.01); *G06Q 50/06* (2013.01); *G06Q 50/28* (2013.01); *G06Q 50/30* (2013.01); *G08G 5/0013* (2013.01); *G08G 5/025* (2013.01); *B64D 2045/0075* (2013.01); *G01W 1/00* (2013.01)

(58) Field of Classification Search
CPC ...... G08G 5/0091; G08G 5/0043; B64F 5/60; G05B 17/02; G05D 1/08; G05D 1/104; G05D 1/106; G06N 7/00; G06Q 10/047; G06Q 10/20; G06Q 50/06; G06Q 50/28; G06Q 50/30; B64D 2045/0075; B64D 45/00; G01W 1/00

See application file for complete search history.

(56) References Cited

FOREIGN PATENT DOCUMENTS

| | | |
|---|---|---|
| CN | 106598056 A | 4/2017 |
| CN | 106886664 A | 6/2017 |
| CN | 108693887 A | 10/2018 |
| CN | 112185174 A | 1/2021 |
| GB | 2587474 A | 3/2021 |

OTHER PUBLICATIONS

"Jeppesen Tail Assignment," Jeppesen (A Boeing Company), published Apr. 2019, available from https://ww2.jeppesen.com/wp-content/uploads/2019/04/tail-assignment-fact-sheet.pdf [accessed Feb. 12, 2020].

Lapp et al. "Incorporating aircraft efficiency measures into the tail assignment problem," Journal of Air Transport Management, published Dec. 15, 2011, vol. 19, pp. 25-30, XP028454842.

Lindner et al. "Potential of integrated flight scheduling and rotation planning considering aerodynamic-, engine- and mass-related aircraft deterioration," CEAS Aeronautical Journal, published Nov. 23, 2018, vol. 10, pp. 755-770, XP036849230.

\* cited by examiner

FLIGHT OPTIMIZATION SYSTEM AND METHOD FOR AIRLINE OPERATIONS

I. CROSS-REFERENCE TO RELATED APPLICATIONS

This application claims benefit to a U.S. Provisional Application No. 62/870,871, filed Jul. 5, 2019, which is hereby incorporated by reference in its entirety.

II. TECHNICAL FIELD

The technical field relates generally to flight optimization for airline operations. In particularly, a flight optimization system and methods performed within various phases of a flight of an aircraft including dynamic aircraft allocation, flight planning, flight path optimization and post flight analysis.

III. BACKGROUND

Currently, airline operations base flight planning and payload limits on modeling as provided by airframers and engine manufacturers. Many conventional systems use these global standards to generate existing flight plans. Therefore, there may be undesired fuel usage, payload restrictions, flight delays and additional costs incurred.

There is a desire to be able to dynamically adjust airline operations during pre-flight, in-flight and post-flight phases of a flight of an aircraft in order to obviate the above-mentioned issues.

IV. SUMMARY OF THE EMBODIMENTS

The present invention addresses the above-mentioned issues by providing a flight optimization system capable of dynamically adjusting aircraft scheduling and flight planning at various cycles of airline operations including pre-flight, in-flight and post-flight phases.

Embodiments of the present invention provide a flight optimization system that includes an onboard aircraft system having a flight management system and an onboard network server, the onboard network server receives flight data from the aircraft, an event measurement system wirelessly downloads the flight data from the onboard network server in real-time, and initiates analytics on the flight data and dynamically and automatically calculates updated payload capacity and fuel bias values in real-time; and a network allocation system receives the updated payload capacity and fuel bias values and data from an external load control system and an aircraft monitoring system, and creates an optimized plan for allocation of the aircraft onto specific routes and generating an updated tail assignment plan before departure to be sent back to an associated airline for manual updates or directly to the aircraft for automatic updates.

According to another embodiment, the flight optimization system performs the in-flight phase of the flight, where the onboard network server receives in-flight data generated during the flight in real-time and weather data from an external source, collates and processes the in-flight data and the weather data through analytics, and wirelessly connects directly to an electronic flight bag having an analytics software application installed therein to be accessed by flight personnel, and receives the flight data and weather data as processed in real-time.

According to an embodiment, the flight optimization system further includes a path optimization application downloadable to the electronic flight bag and that receives the processed data from the analytics software application in real-time and performs a vertical path optimization process, via the onboard network server, by changing a vertical control policy in a climb phase of flight and utilizing the in-flight data and weather data processed to generate an optimized flight path including a unified climb, cruise and decent profile.

According to yet another embodiment, the flight optimization system further initiates a post-flight cycle after landing the aircraft, where the onboard network server (e.g., aircraft quick access recorder) receives post-flight data and wirelessly download the post-flight data to the event measurement system, and the event measurement system also receives operational data via external operational sources of an associated airline and merges the operational data with the post-flight data and analyzes the aircraft and engines of the aircraft and sends associated data to the fleet support system, the maintenance system and other operational systems such as flight planning.

According to still another embodiment, a method of flight optimization and a computer-readable medium of the above-mentioned flight optimization system are also provided.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

IV. DESCRIPTION OF THE DRAWINGS

Figure 1:
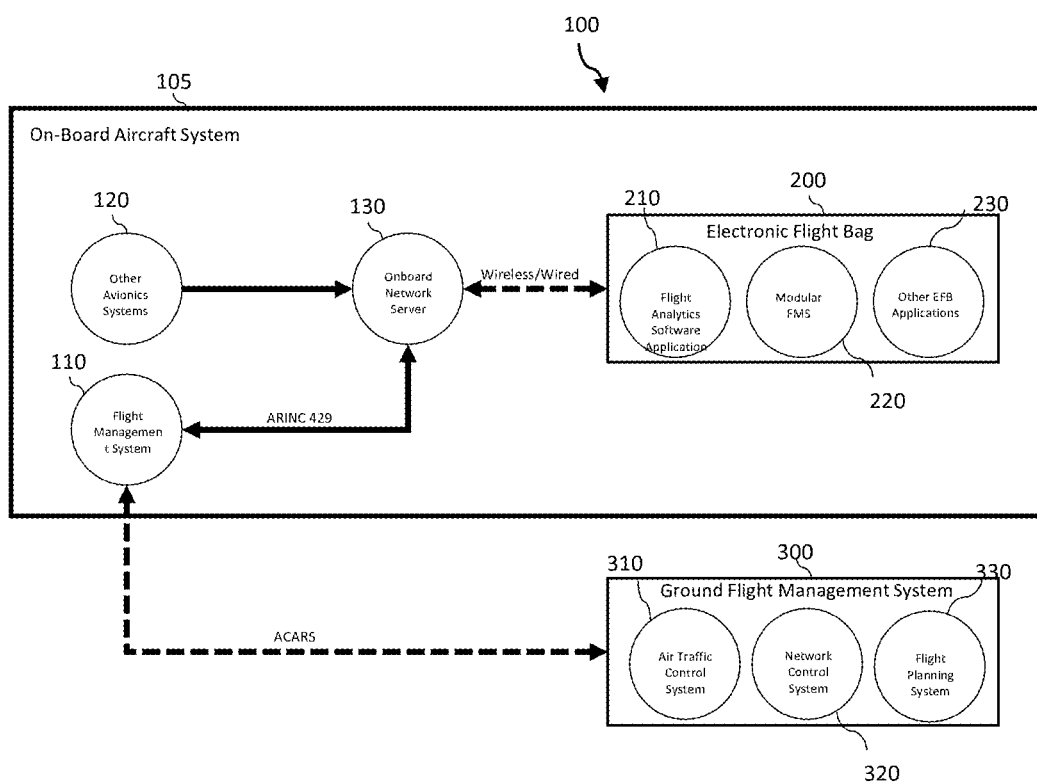
FIG. 1 is a block diagram of the flight optimization system according to one or more exemplary embodiments of the present invention.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

V. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Embodiments of the present invention provide a flight optimization system that dynamically performs optimization of flight operations systems during pre-flight, in-flight and post-flight cycles of an aircraft system. The flight optimization system is implemented utilizing on-board analytics in electronic flight bags (EFBs) including flight crew individualized flight data, aircraft connectivity hardware and software, on-ground flight analytics and a network allocation unit. The system improves tail performance including fuel consumption, passenger load, flight routes and overall performance of a specific aircraft of an airline fleet. Each aircraft has individual characteristics varying from tail number to tail number (i.e., from the departure location to the destination) so each onboard aircraft system 105 needs to be personalized for the tail. For a given tail, performance can change over time, for example, as engines wear at different rates and seals degrade, or the aircraft accumulates dirt and water in the structure, or patches and repairs and repainting increases weight and drag. So the on-board aircraft system 105 and the flight planning system 330 on the ground need to be not only tail-specific but updated continuously and automatically with new performance parameters and other real-time date to ensure optimum planning and operation of each flight of the aircraft 450. Therefore, unlike conventional systems, the flight optimization system 100 of the present invention optimizes the overall flight including the tail performance at the aircraft's 450 level.

As shown in FIG. 1, the flight optimization system 100 includes an onboard aircraft system 105 comprising a flight management system (FMS) 110 integrated with the Communications Management Unit 110, other avionics systems 120 including onboard sensors and cockpit displays and an onboard network server 130 being an aircraft interface device (AID).

The flight management system 110 integrated with the Communications Management Unit 110 is configured to perform inflight management of flight plans using various sensors to determine flight position and weather conditions, for example. The flight management system 110 is also configured to provide an air-to-ground, two-way data link direct to the ground system via the aircraft's VHF radio, satcom or digital telephone system via the Communication Management. Unit.

As shown, the flight management system 110 and the other avionics systems 120 both communicate with the onboard network server 130 via a two-way avionics data bus such as an aeronautical communications services e.g., an Aeronautical Radio (ARINC®) 429 and/or Ethernet.

The onboard network server 130 is an aircraft interface device (AID) interfacing between the aircraft systems and the crew's electronic flight bags (EFBs) 200 which are also included in the onboard aircraft system 105. The onboard network server 130 is configured to transfer data to and from the EFBs 200 via a wireless or wired network. The server 130 provides data recording, wireless connectivity, terminal wireless connectivity, Wi-Fi for crew devices, data loading, EFB data interface and application hosting.

Figure 3:
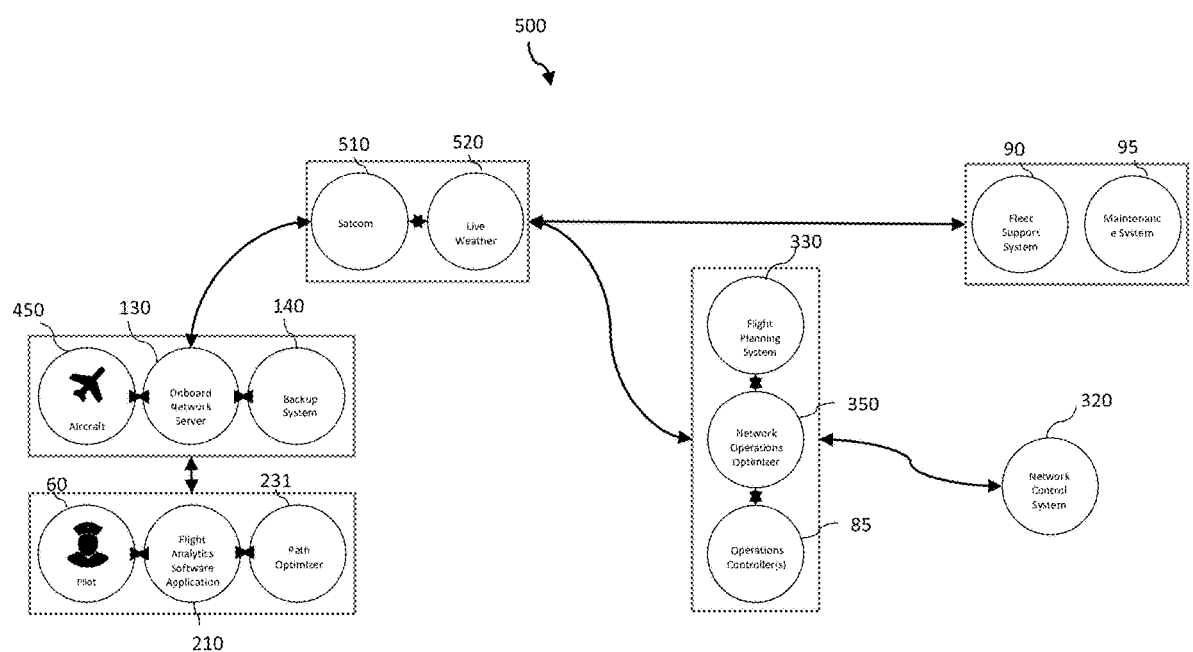
FIG. 3 is a block diagram illustrating an in-flight cycle implemented by the flight optimization system of FIG. 1 according to one or more exemplary embodiments of the present invention.

Each Electronic flight bag (EFB) 200 includes personalized flight analytics software application 210 such as Flightpulse®, a modular flight management system (FMS) and other EFB applications 230 including for example, a path optimizer application 231 (as depicted in FIG. 3). Other EFB applications include map/charting applications, weather applications, fuel ordering and flight planning applications including aircraft performance and aircraft system manuals. The software application 210 connects pilots directly to personal flight analytics by merging flight data with other operational information. The application 210 also provides analytics related to safety and fuel usage to enable pilots to increase their operational efficiency. The EFB 200 can be accessed by the Pilot or other flight personnel via a mobile device e.g., an iPad® or the like.

Although only one EFB 200 is shown for illustration purposes, the invention can be implemented within multiple EFBs 200 at the same time.

Also shown, the flight optimization system 100 is also in communication with a ground flight management system 300 including air traffic control system 310, network control system 320 and flight planning system 330. The flight management system 110 receives and transmits data to and from the ground flight management system 300 via an Aircraft Communications Addressing and Reporting System (AGARS) which is a digital data link system for transmission of short messages between an aircraft and ground via Airband radio or satellite. Alternatively, the data can be transmitted via other type of satellite or secure broadband systems.

The air traffic control system 310 facilitates control of aircraft traffic on the ground and through airspace. The network control system 320 is used to monitor the location and configuration of aircraft throughout the network. It provides operations staff with an overview of what is happening and can provide alerts if there are issues. The flight planning system 330 plans the required fuel for an aircraft to complete its flight. The plan takes into consideration, distance, weather, passenger loads, cargo loads, aircraft defects or limitations and other regulatory limits.

Additional details regarding the communications between the onboard aircraft system 105 and the ground flight management system 300 will now be discussed with reference to FIGS. 2 through 5 below.

Figure 2:
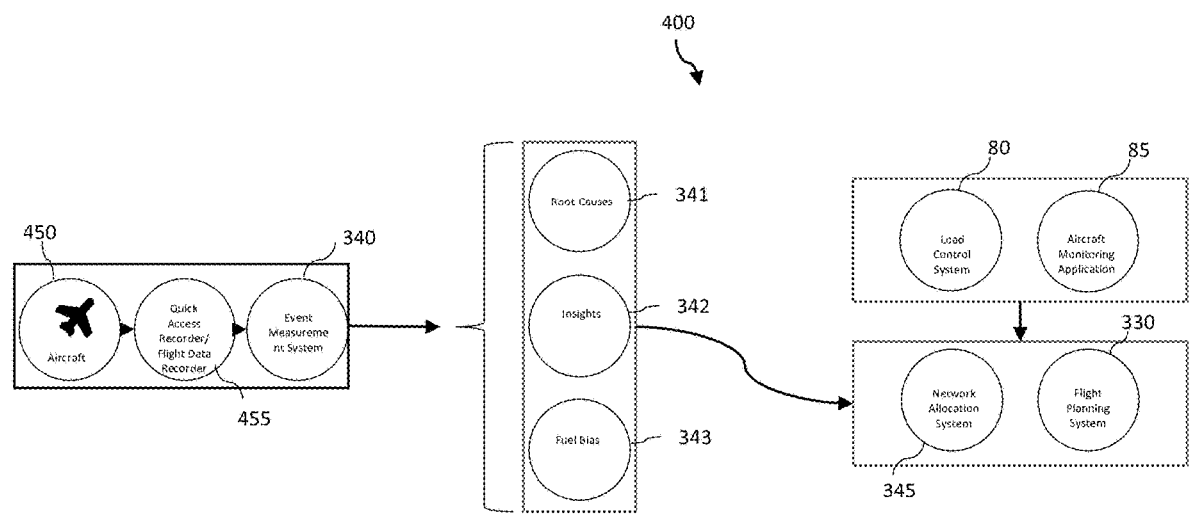
FIG. 2 is a block diagram illustrating a pre-flight cycle implemented by the flight optimization system of FIG. 1 according to one or more exemplary embodiments of the present invention.

As shown in FIG. 2, the first cycle performed by the flight optimization system 100 is the pre-flight cycle 400 of a flight. Although, flight planning is performed well in advance of the flight, the flight optimization system 100 performs a route optimization as a part of the pre-flight cycle 400 of the flight. According to embodiments of the present invention, the pre-flight cycle 400 occurs prior to aircraft pushback. In some embodiments, pre-flight cycle can range from between 3-5 days before and approximately 5-6 hours before a given flight of the aircraft 450.

During pre-flight cycle 400, an aircraft 450 generates flight data corresponding to data which was available during the off-boarding process when the aircraft 450 returned to the gate after a previous completed flight. The flight data is stored and transmitted through a Quick Access Recorder (QAR) or Flight Data Recorder (FDR) 455 which is also included in the onboard aircraft system 105 (e.g., the onboard network server 130 or the other avionics systems 120, as depicted in FIG. 1) of the aircraft 450. The QAR/FDR 455 is configured to record specific aircraft parameters e.g. aircraft speed, location, altitude, systems pressures and temperatures and other items that are selected by airlines. The QAR/FDR 455 communicates with the ground flight management systems 300 via for example, a stand-alone Wi-fi or cellular system.

The flight data includes aircraft generated data and engine generated data. The onboard network server 130 including the aircraft interface device (AID) is configured to read the flight data from data buses of the aircraft 450. The onboard network server 130 is also configured to determine when the aircraft 450 has landed on the ground, at which point it transmits recorded data from the quick access recorder/flight data recorder 455 to the ground flight management system 300 (as depicted in FIG. 1).

The ground flight management system 300 further includes an event measurement system (EMS) 340. The flight data stored in the quick access recorder/flight data recorder 455 is wirelessly downloaded to the event measurement system (EMS) 340 over a wireless communication such as a 4G LTE connection.

The event measurement system 340 is configured to (i) perform analytics using a set of algorithms to determine root causes 341 of aircraft inefficiencies, (ii) provide insights 342 regarding events that occurred on the aircraft 455 and (iii) calculate fuel bias 343 that an aircraft will burn compared to a default predetermined model provided by associated aircraft manufacturer stored in the event measurement system 340. According to some embodiments, the root causes 341 can include airframe draft (e.g., incorrect maintenance action, dirty aircraft, incorrect planning system assumptions), engine performance (e.g., fuel density or engine wear). Also, according to some embodiments, the insights 342 include which engine or aircraft has the best performance. The event measurement system 340 analyzes the fuel burn deterioration, actual historical route performance, statistical wind models and variations in aircraft empty weight of the aircraft 450 and then dynamically and automatically calculates an updated passenger or cargo carrying capacity (i.e., a payload capacity value) in real-time.

The event measurement system 340 further calculates the fuel bias 343 by assigning an updated fuel bias value and displaying the probable root causes 341 of the fuel inefficiencies. The fuel bias information including the updated fuel bias value are then used by the flight planning system 330 and a network allocation system 345 which is also included in the ground flight management system.

The network allocation system 345 is configured to receive the data from the event measurement system 340 and from external sources such as a load control system 80 and network control system 320 which tracks the aircraft 450, and from the flight planning system 330; and create an optimized plan for the allocation of the aircraft 450 onto specific routes that the aircraft 450 will fly. The network allocation system generates the optimized aircraft allocation plan using additional statistical modeling and the payload information received from the EMS 340 to generate passenger and cargo payload caps on payload-limited routes taking into account relative fuel burn deterioration, actual historical route performance, historical engine performance records, maintenance records, aircraft configuration data (e.g., the number of seats on the aircraft), aircraft minimum equipment list, current flight routes, planned passenger load, forecasted weather, historical weather conditions and statistical wind models and variations in aircraft empty weight. The network allocation system 345 proactively generates an updated aircraft tail assignment plan days before departure and recommends passenger loads based on operations and efficiency requirements for aircraft 450. The optimized plan is then sent from the network allocation system 345 to the appropriate airline personnel for performing manual updates or sent via a messaging system (e.g., adhoc schedule message (ASM) updates) back to the appropriate source systems such as reservations, crew control and crew applications. for automatically updating those systems for the airline. Updates are also sent back to the EFBs 200 of the crew of the appropriate aircraft 450.

As shown in FIG. 3, the second cycle performed by the flight optimization system 100 is the in-flight cycle 500 of a flight. According to embodiments of the present invention, the in-flight cycle 500 occurs after the aircraft 450 has taken off. Longer flights which exceed approximately 19 or more hours require continual monitoring during operation. There is increased pressure to reduce the time in which an aircraft (e.g., the aircraft 450) sits on the ground and the ability to recover proactively when problems arise can make the different between on-time departures and costly delays. The flight optimization system 100 is able to improve risk mitigations, and when problems arise derive efficient paths to recovery by suggesting action plans that take into consideration the operating and financial impacts associated with each previously detected aircraft performance issue.

As shown in FIG. 3, after the aircraft 450 has taken off and is generating data, the generated data is transmitted to the onboard network system 130. The information is also stored in a backup system 140 which can be a real-time computer network airborne system such as an integrated modulated avionics (IMA) system, for example. The onboard network server 130 is configured to further receive data including live weather data 520, for example, from a communications satellite (e.g., SATCOM) 510.

Upon receiving the generated data, the onboard network server 130 collates and processes the data through airframe and engine models customized to the specific aircraft and engine serial numbers. The onboard network server 130 wirelessly connects directly to the flight analytics software application 210 on the EFB 200 to be accessed by flight personnel (e.g., a Pilot 60) in order to provide the crew with the generated data directly from the onboard network server 130 and process it in real-time. According to other embodiments, the onboard network server 130 may transmit the data to the ground flight management system 300 for further analysis and monitoring prior to sending it to the EFB 200. The present invention provides the benefit of sending the data directly from the onboard network server 130 to the EFB 200 for accessing so that the Pilot 60 can have access to updated flight routes when there is limited connectivity or communication with the ground flight management system 300 is impacted by bad weather conditions or solar weather issues.

The real-time livestream data received by the software application 210 and the path optimizer application 231 from the onboard network server 130. The path optimizer application 231 is configured to perform further flight path optimization using path optimization techniques. The path optimization techniques include vertical path optimization by changing the vertical control policy in the climb phase of flight and utilizing additional weather and flight plan information to generate a full unified climb, cruise and decent (UCCD) profile and generate a more optimized flight profile by finding ideal locations to step climb or descend. The optimization process implements a variable speed, variable thrust climb profile based on aircraft performance parameters and integrated with real time wind and temperature data. The optimized flight information is then viewable by the Pilot 60 via the EFB 200. The real-time availability of this optimized flight information also allows the Pilot 60 to perform self-learning. Further, according to other embodiments, the data from the EFB 200 including the optimized flight information can be aggregated to the event measurement system 340 to provide further insight to the flight personnel at the pre-flight cycle 400 to understand safety issues and fuel burn considerations, for example for upcoming flight.

There are several advantages of the path optimizer application 231 according to embodiments of the present invention including that the entire flight trajectory can be optimized instead of only a single phase of flight so that every pound of fuel spend climbing is gained back by a more efficient cruise; the weather between waypoints interpolated for time-of-flight is used in the vertical path optimization calculations instead of just weather at entered waypoints; and an optimal flight path is continuously recalculated in real-time while the aircraft 450 travels so as data changes the information is fed back into the aircraft 450.

As the data is being processed by the onboard network server 130 and the flight being optimized by the path optimizer application 231 the processed data and optimized flight path data is sent to the Operations controller(s) 85, the flight planning system 330 and a network operations optimizer 350 of the ground flight management system 300. Within the ground flight management system 300 the data is then compared to full historic data for the aircraft 450. The comparison to full historic data of the aircraft 450 enables the system 100 to forecast whether the aircraft 450 will be able to complete the flight without any issues. According to one embodiment, if the system 100 determines that the aircraft 450 will not be able to successfully complete the flight a trigger alert is generated and sent to the network operations optimizer 350 for recovery purposes.

According to an embodiment of the present invention, the network operations optimizer 350 is configured to receive the real-time data received from the aircraft 450 and processed via the onboard network server 130 and further processes the data via algorithms taking into account aircraft restrictions, passenger connecting flight information, airline flight schedules, and flight crew duty periods, for example. The network operations optimizer 350 further simulates different scenarios revolving around flight cancellations, delays or diversions to thereby generate an action plan which will have a positive impact on revenue, operational costs, on-time performance, passenger itineraries, and passenger satisfaction levels. The action plan is then transmitted to the network control system 320 for further optimized tracking of the aircraft 450 and sent back to the onboard network server 130 of the aircraft 450 for any necessary updates.

The information from the onboard network server 130 is also sent to the OEM fleet support team 90 and maintenance monitoring 95 so airline personnel (e.g., engineers and maintenance crew) are aware of all flight plan updates and any safety issues onboard the aircraft 450 in real-time.

Figure 4:
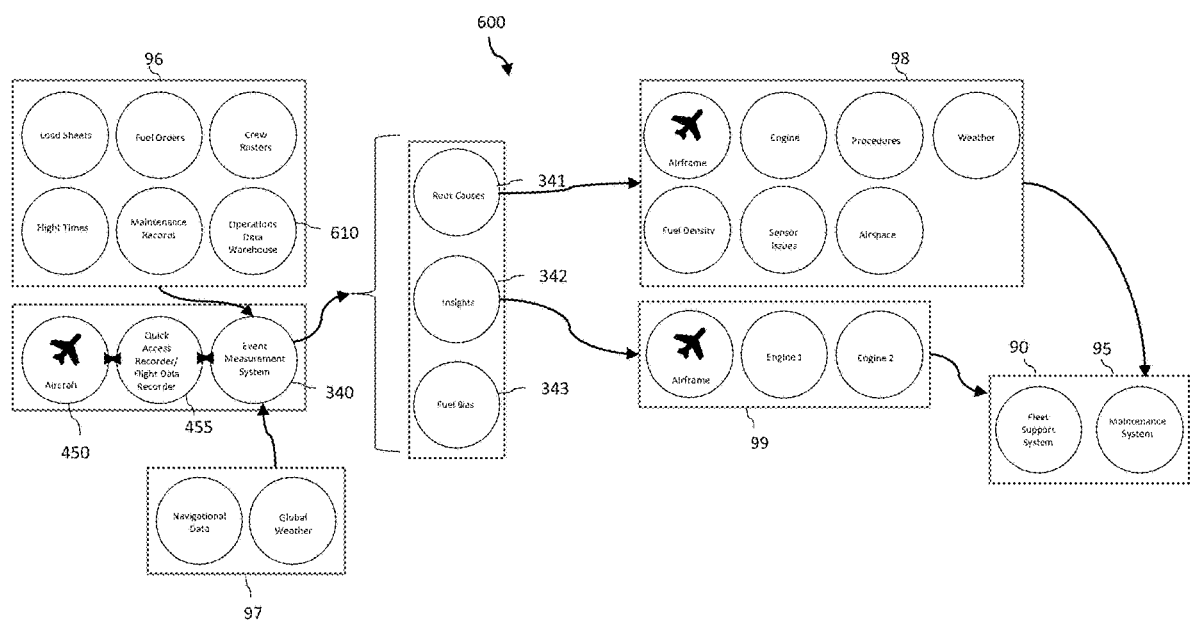
FIG. 4 is a block diagram illustrating a post-flight cycle implemented by the flight optimization system of FIG. 1 according to one or more exemplary embodiments of the present invention.

As shown in FIG. 4, the third cycle performed by the flight optimization system 100 is the post-flight cycle 600 of a flight. According to embodiments of the present invention, the post-flight cycle 600 occurs after the aircraft 450 has landed. The onboard-network server 130 (as depicted in FIGS. 1 and 3) is configured to recognize when the aircraft 450 has landed.

The post-flight cycle 600 implemented within the aircraft 450 uses the same data stored in the quick access recorder/flight data recorder 455 as used during the pre-flight cycle in addition to other data as discussed below. During the post-flight cycle 600, the flight data offboarding process for the aircraft 450 is initiated when the aircraft 450 returns to the gate post-flight. The flight data from the aircraft 450 which is stored in the quick access recorder/flight data recorder 455 is wirelessly downloaded to the event measurement system 340. The data is obtained via the onboard network server 130 (as depicted in FIG. 1). The event measurement system 340 also receives operational data 96 from key operational sources of an associated airline including aircraft-related data as well as specific engine-related data of the aircraft 450. The operational data 96 is ingested, decoded and stored with the flight data collected from the aircraft 450. Some of the operational data includes for example, load sheets, fuel orders, flight times, maintenance records, crew rosters, and corporate data. The event measurement system 340 also receives navigational data and global weather data 97 from external navigational sources and weather sources. Similar to in the pre-flight cycle 400, in the post-flight cycle 600 the event measurement system 340 is configured to (i) perform analytics using a set of algorithms to determine root causes 341 of aircraft inefficiencies, (ii) provide insights 342 regarding events that occurred on the aircraft 455 and (iii) calculate fuel bias 343. The root causes 341 includes data 98 associated with the airframe, engine, procedures weather, fuel density, any sensor issues and airspace information. Further, the insights 342 includes data 97 associated with the airframe and specific engine-related data for engine 1 and engine 2 for example. The data 98 and 99 is sent to the fleet support system 90 and the maintenance system 95 for further analysis and updating of associated aircraft-related concerns (e.g., flight plans, maintenance plans).

Figure 5:
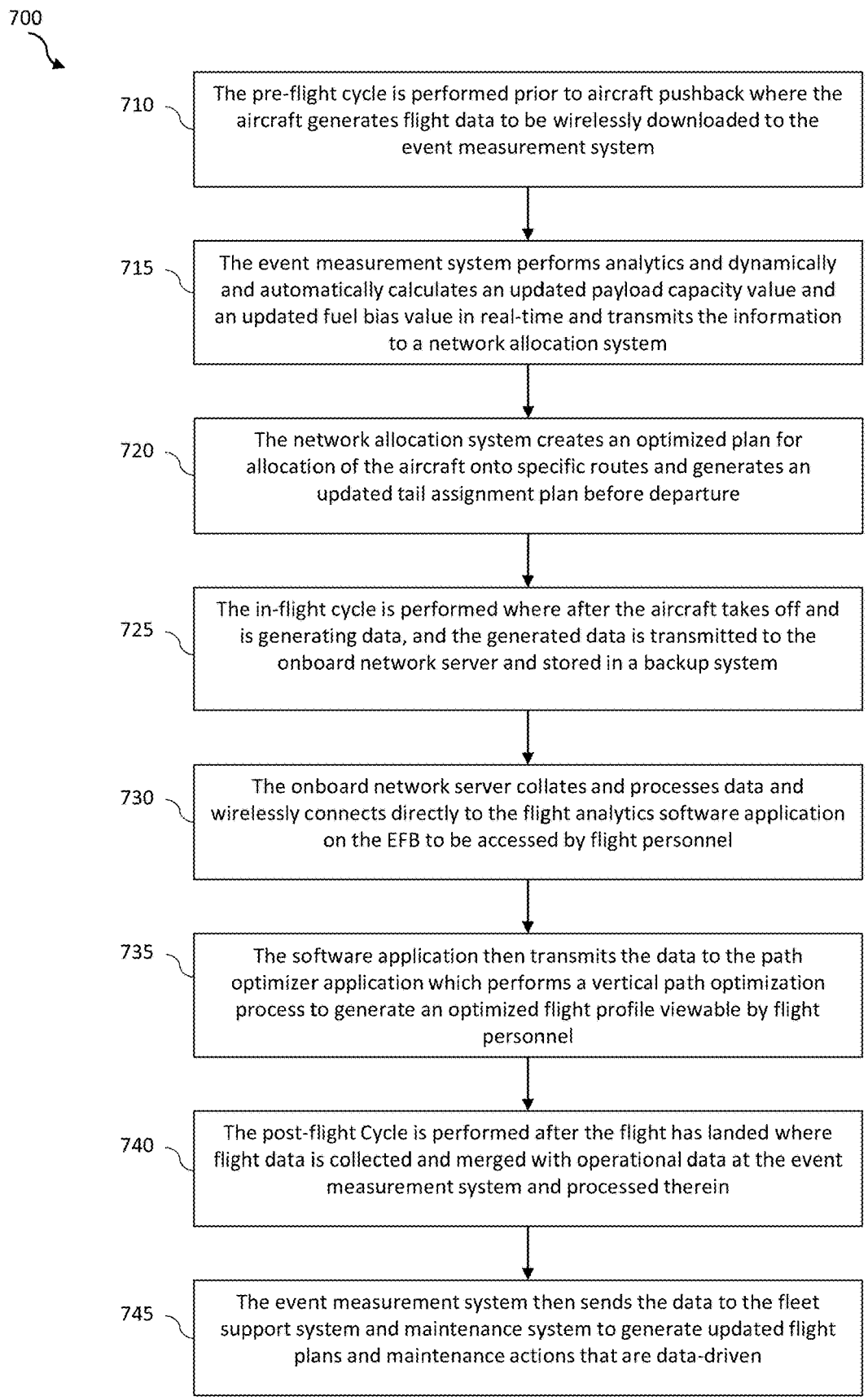
FIG. 5 is a flow diagram illustrating a complete life cycle of the flight optimization system including the pre-flight, in-flight and post-flight cycles of FIGS. 2, 3 and 4 according to one or more exemplary embodiments of the present invention.

Referring now to FIG. 5, is a flow diagram illustrating a method 700 of a complete life cycle of the flight optimization system 100 will now be discussed in reference to the pre-flight, in-flight and post-flight cycles 400, 500 and 600 of FIGS. 2, 3 and 4 according to one or more exemplary embodiments of the present invention.

The method 700 begins at operation 710, wherein the pre-flight cycle 400 is performed prior to aircraft pushback where flight data from previous flights are stored and transmitted through a QAR/FDR in the onboard aircraft system, and then wirelessly downloaded to the event measurement system (EMS) 340 over a wireless communication. At operation 715, the event measurement system performs analytics and dynamically and automatically calculates an updated payload capacity value and an updated fuel bias value in real-time and transmits the information to a network allocation system. At operation 720, the network allocation system creates an optimized plan for allocation of the aircraft onto specific routes and generates an updated tail assignment plan before departure to be sent back to airline or aircraft for manual or automatic system updates, respectively.

Next, at operation 725, the in-flight cycle 500 is performed where after the aircraft takes off and is generating data the generated data is transmitted to the onboard network server and stored in the backup system. At operation 730, the onboard network server collates and processes data and wirelessly connected directly to the flight analytics software application on the EFB to be accessed by flight personnel. At operation 735, the same data is used by the path optimizer application which performs a vertical path optimization process to generate an optimized flight profile viewable by the flight personnel. Embodiments of the in-flight cycle allows for corrective action in real-time as well as decision support and recovery efforts.

Lastly, at operation 740, the post-flight cycle 600 is performed after the flight has landed where flight data is collected and merged with operational data from key operational sources of the airline in the event measurement system and processed therein. The event measurement system 340 then sends the data to the fleet support system and the maintenance system generate updated flight plans and maintenance actions which are data-driven, to thereby ensure efficient operations of the aircraft and its engines (at operation 745).

An additional advantage of the flight optimization system 100 according to embodiments of the present invention include the airline's ability to use the data collected and analyzed to determine the aircraft and/or engines to be installed on the aircraft which would result in a more efficient flight.

Those skilled in the relevant art(s) will appreciate that various adaptations and modifications of the embodiments described above can be configured without departing from the scope and spirit of the disclosure. For example, while exemplary embodiments have described in the context of presence in and occupancy of a room, embodiments of the present disclosure can be deployed in other settings like a car windshield in order to detect rain or snow, or at an outdoor light fixture to determine changes in the weather or nearby traffic patterns, or for in a store to determine patron traffic and store occupancy. Therefore, it is to be understood that, within the scope of the appended claims, the teachings featured herein may be practiced other than as specifically described herein.

What is claimed is:

1. A method of flight optimization of an aircraft performed by a flight optimization system, via a processor, the method comprising:
generating flight data via an onboard aircraft system;
wirelessly downloading, at a flight ground management system, the flight data from an onboard network server of the onboard aircraft system in real-time via a digital data link, and initiating a pre-flight cycle of a flight of the aircraft by performing analytics on the flight data and dynamically and automatically calculating updated payload capacity and fuel bias values in real-time;
receiving the updated payload capacity and fuel bias values and data from an external load control system and an aircraft monitoring system, creating an optimized plan for allocation of the aircraft onto specific routes, and generating an updated tail assignment plan before departure to be sent back to an associated airline for manual updates or directly to the aircraft for automatic updates, and
generating the optimized plan using statistical modeling and the updated payload capacity and fuel bias values to generate payload caps on payload-limited routes, wherein the aircraft is operated based on the updated tail assignment plan and the optimized plan as generated.

2. A flight optimization system for an aircraft comprising:
an onboard aircraft system comprising a flight management system and an onboard network server, the onboard network server being configured to obtain flight data from the aircraft; and
a processor configured to perform the method of claim 1.

3. The flight optimization system of claim 2, wherein the processor is further configured to:
perform the analytics using a set of algorithms to determine root causes of aircraft inefficiencies; and
determine insights regarding events that occurred on the aircraft.

4. The flight optimization system of claim 3, wherein the processor is further configured to analyze fuel burn deterioration, actual historical route performance, statistical wind models and variations in aircraft empty weight.

5. The flight optimization system of claim 2, further performing an in-flight cycle of the flight, wherein:
the onboard network server is configured to:
receive in-flight data generated during the flight in real-time and weather data from an external source;
collate and process the in-flight data and the weather data through analytics; and
wirelessly connect directly to an electronic flight bag having an analytics software application installed therein to be accessed by flight personnel, and transmit the in-flight data and weather data as processed in real-time.

6. The flight optimization system of claim 5, further comprising:
a path optimization application downloadable to the electronic flight bag and configured to receive the processed data from the onboard network server in real-time and perform a vertical path optimization process by changing a vertical control policy in a climb phase of flight and utilizing the in-flight data and weather data processed to generate an optimized flight path including a unified climb, cruise and decent profile.

7. The flight optimization system of claim 6, wherein the optimized flight path is transmitted to a ground flight management system for further analysis.

8. The flight optimization system of claim 7, wherein if the ground flight management system determines that the flight will be unsuccessful based on the optimized flight path, a trigger is sent to a network operations optimizer for determining a recovery process, wherein the network operations optimizer is configured to simulate different scenarios to determine an action plan for recovery.

9. The flight optimization system of claim 5, wherein the in-flight data and the weather data processed by the onboard network system is transmitted to a fleet support system and a maintenance system in real-time for scheduling of updated flight plans and maintenance actions.

10. The flight optimization system of claim 9, wherein a post-flight cycle is initiated after landing the aircraft, wherein the onboard network server is further configured to receive post-flight data and wirelessly download the post-flight data to the processor; and
wherein the processor is further configured to receive operational data via external operations of an associated airline and merge the operational data with the post-flight data and analyze the aircraft and engines of the aircraft and send associated data to the fleet support system and the maintenance system.

11. The flight optimization system of claim 10, wherein the associated data sent to the fleet support includes at least one of airframe, engine, procedures, weather, fuel density, any sensor issues, and airspace information, and the associated data sent to the maintenance system includes at least one of airframe and specific engine-related data.

\* \* \* \* \*